3,194,774
RESINS HAVING SUBSTANTIAL OIL LENGTHS AND IMPROVED WATER SOLUBILITY PREPARED FROM POLYCONDENSATION REACTION PRODUCTS
Gus Nichols, Galveston, Tex., assignor to Standard Oil Company, Chicago, Ill., a corporation of Indiana
No Drawing. Filed May 2, 1962, Ser. No. 191,742
9 Claims. (Cl. 260—22)

This invention relates to resins having air-drying properties derived from polycondensation reaction products, and particularly to resins having substantial oil lengths and improved water solubility.

Resins have been prepared from polycondensation reaction products in the past and have been found useful for coatings to protect surfaces from erosion and corrosion.

Many of these resins contain fatty acid groups to impart air-drying properties to the resins and these are included within the classification of "alkyd resins." These fatty acid group containing resins or oil modified resins can be characterized by their "oil length," a term known in the art. The oil length may be short, medium or long. The long oil length resin contains a higher percentage of fatty acid groups than the short oil length resin. The longer oil length resins offer the advantage of flexibility in coatings prepared from the resins. This flexibility is especially desirable when the coatings are applied to surfaces such as wood, which tends to expand and contract. Without this flexibility feature, the coating tends to break and expose the underlying surfaces.

In addition to the flexibility feature of the resins, it has been desirable in many instances to make the oil modified resins water soluble. Water soluble resins provide the advantages of safety, greater ease in cleaning the equipment used to apply the resins and other inherent advantages of a water system.

It has not always been possible to prepare resins having the higher oil lengths and solubility in water. The higher oil length resins tend to be more soluble in hydrocarbon solvents and less soluble in water as the oil length increases.

One object of this invention is a resin having substantial amounts of oil (or fatty acid groups) and solubility in water. Another object of this invention is a resin having substantial amounts of oil and solubility in water which resin is suitable for use as a protective coating material. Other objects of this invention will become apparent from the detailed disclosure.

A resin has been discovered that contains substantial amounts of oil and has solubility in water. It has also been discovered that this water soluble resin has properties which make it useful as a protective coating material.

The novel water soluble resin which is suitable for the formation of an air-drying surface coating film comprises a reaction product of (I) a polycondensation reaction product of (a) a benzene tricarboxylic acid or anhydride of the acid or substituted derivatives of either, (b) a monohydric alcohol, (c) a dihydroxyl group affording material derived from a compound affording at least 3 hydroxyl groups, an unsaturated fatty acid, and a furan containing acid, said polycondensation reaction product being characterized by an oil length of from about 45% to about 80%, and (II) an alkaline agent selected from the class consisting of ammonia, alkylamines, heteroamines and alkanolamines. A fatty acid group containing alcohol may also be utilized.

The benzene tricarboxylic acids and/or anhyrides which enter into the polycondensation reaction include trimellitic acid, trimellitic anhydride, hemimellitic acid, hemimellitic anhydride and trimesic acid, with trimellitic acid and trimellitic anhydride being preferred. In addition to unsubstituted acids and anhydrides, there may be utilized substituted acids and anhydrides. The substituents must be inert with respect to entering into the reaction and should not be hydroxyl and amino groups. Types of substituents which may be present are hydrogen, alkyl groups having 1–5 carbon atoms and preferably methyl, t-butyl, sec-butyl, and neopentyl; and halogens, preferably chlorine. Examples of substituted acids are: hexahydrotrimettitic anhydride, t-butyl trimellitic acid, methyl trimellitic acid, trichloro trimellitic acid, and methyl hemimellitic acid. For convenience, the unsubstituted and substituted acids and anhydrides are hereinafter generally referred to as acidic members and the amounts of the various reactants charged to the polycondensation zone are considered with respect to the acidic member charged to that zone.

The monohydric alcohol is generally one which contains an ether group. These include the heterocyclic alcohols such as the monohydroxyalkylene tetrahydrofurans and the straight chain polyalkylene glycol monoalkyl ethers, with the heterocyclic alcohols being preferred. Examples of the heterocyclic alcohols include the monohydroxyalkylene tetrahydrofurans having from 1 to about 4 carbon atoms in the alkylene group such as 2-hydroxymethylene tetrahydrofuran, 3-hydroxymethylene tetrahydrofuran, 2-hydroxypropylene tetrahydrofuran, 2-hydroxybutylene tetrahydrofuran, etc. Substituted heterocyclic alcohols may be utilized and include 2,5-dimethyl 2-hydroxymethylene tetrahydrofuran, 2-ethyl 2-hydroxypropylene tetrahydrofuran, etc.

Examples of the polyalkylene glycol monoalkyl ethers include those having from 2 to 8 ether groups, from 2 to 3 carbon atoms in each alkylene group, and from 1 to 8 carbon atoms in the alkyl groups. Numerous species of these ethers are available commercially under the "Carbitol" trade name and generally considered as alkyl Carbitols. The Carbitols are alkylation reaction products of ether glycols and alkanols. Examples of specific ether glycols are diethylene glycol, triethylene glycol, tetraethylene glycol, and polyethylene glycols containing not more than 8 ether linkages; dipropylene glycol, triproylene glycol, and polypropylene glycols containing not more than 8 ether linkages. Examples of specific alkanols are methanol, ethanol, isopropanol, n-butanol, t-butanol, t-butyl alcohol, and octanol. The mixtures of isomeric alkanols prepared by the Oxo process are particularly suitable, especially isooctyl alcohol. Examples of the specific nomenclature utilized herein is the alkylation product of diethylene glycol with ethanol which product is known as diethylene glycol monoethyl ether or 2-(2-ethoxyethoxy) ethanol or ethyl Carbitol.

The third material which enters into the polycondensation reaction is derived from a compound having at least 3 hydroxyl groups an unsaturated fatty acid, and a furan containing acid selected from the class consisting of a furan substituted aliphatic acid having from 1 to about 3 carbon atoms in its aliphatic acid group, and a substituted derivative of the acid. The material is characterized as a dihydroxyl group affording material in that each molecule of the material has an average of two hydroxyl groups.

The compound which has at least 3 hydroxyl groups may be considered a polyhydric alcohol and includes the typical polyhydric alcohols which have been used in the preparation of alkyd resins such as glycerol, trimethylol ethane, trimethylol propane, erythritol, treitol, pentaerythritol, dipentaerythritol, sorbitol and mannitol.

The unsaturated fatty acid refers to acids derived from semidrying and drying oils used in the preparation of alkyl resins. The fatty acids containing 16–24 carbon atoms are particularly suitable. In some instances, the fatty acids having at least two olefinic bonds are desirable since their use generally results in faster drying resins or coatings. The polyethenoid fatty acids include acids such as linoleic, hiragonic, eleostearic, moroctic, arachidonic, clupanodonic, and nisinic. Economical sources of the fatty acids are the natural mixtures of acids obtained from semidrying and drying oils such as tall oil, soybean oil, safflower oil, linseed oil, tung oil, etc.

The furan substituted aliphatic acid has from 1 to about 3 carbon atoms in the aliphatic acid group. The aliphatic acid group may be saturated (alkyl) or unsaturated (alkenyl). An especially suitable acid has 1 carbon atom in the aliphatic acid group (furan methanoic acid). These acids include furan substituted methanoic acids, ethanoic acids, and propenoic acids. Substituted acids may also be utilized and include such acids as 5-t-butyl-2-furan methanoic acid, 4-bromo-2-furan methanoic acid, etc.

The dihydroxy group affording material may be prepared directly from the compound, fatty acid and furan containing acid or it may be prepared from partially esterified products of the defined compound and the fatty acids which products are reacted with the defined furan containing acid. When the fatty acid and furan containing acid are reacted with the same molecule of the defined compound, the compound contains at least 4 hydroxyl groups in order for the resulting material to be dihydroxyl group affording. However, it is not necessary that both the fatty acid and furan containing acid be so reacted with the same molecule of the compound. Mixtures of partial esters formed from both the fatty acids and the compound and from furan containing acids and the compound may also be utilized.

The monohydric alcohol is generally present in a mole ratio to the benzene tricarboxylic acid and/or anhydride of at least about 0.4 and preferably from about 0.4 to about 1.

In addition to incorporating the fatty acid groups or oil into the resin by the dihydroxyl group affording material, these groups may also be incorporated by using an alcohol having one hydroxyl group and containing fatty acid groups. This alcohol or monohydroxyl member reacts with the acidic member such as trimellitic anhydride in much the same way as the defined monohydric alcohol. The monohydroxyl member is usually a partial ester of the defined compound such as glycerol and pentaerythritol, and the defined fatty acids such as tall acids and safflower fatty acids. The resulting ester has one free hydroxyl group.

The monohydroxyl member may be present in an amount up to about 0.6 mole per mole of acidic member. The sum of the monohydric alcohol and monohydroxyl member is preferably not more than about 1 mole per mole of acidic member because greater amounts tend to limit the chain lengths of the polycondensation reaction product by decreasing the functionality of the acidic member.

The polycondensation reaction product can be characterized by its oil length. When resins having higher oil lengths are desired, the polycondensation reaction product may have an oil length of above about 45%. An especially suitable polycondensation reaction product results when the oil length is from about 45% to about 80%. The oil length is determined by dividing the weight of fatty acids (times 100) by the weight of polycondensation reaction product and then dividing the quotient by .96 in order that the oil length be based on triglyceride. This basis has found acceptance in the art.

The furan containing acid is utilized in an amount sufficient to impart water solubility to the reaction product of the polycondensation reaction product and the alkaline agent. The amount of the furan containing acid present depends generally on the oil length of the polycondensation reaction product and usually, the amount required decreases as the oil length decreases. An indication of a suitable amount for a higher oil length (70%) is 0.8 mole when furoic acid is utilized with 1 mole of trimellitic anhydride, 1.1 moles of pentaerythritol, 1.4 moles of tall acid, 0.4 mole of tetrahydrofurfuryl alcohol and 0.6 mole of tritalloate of pentaerythritol. When the oil length is decreased to about 45% and 0.4 mole of the monohydric alcohol is present, only a small amount of the furan containing acid is usually required.

The amount of the defined compound affording at least 3 carboxyl groups which is present can be determined once the oil length and the amount of the furan containing acid to be utilized is known. The oil length determines the amount of the fatty acid present and that value plus the amount of the furan containing acid present can be used to determine the amount of the compound to be utilized since the resulting material affords two free hydroxyl groups. For example, when 0.8 mole of a furan containing acid and 1.4 moles of a fatty acid are utilized and the compound contains 4 hydroxyl groups, then the amount of the compound to be used is in the order of 1.1 moles or one half of the sum of the furan containing acid and fatty acid in order that the resulting material afford two hydroxyl groups per molecule.

In general, the defined material is charged to the polycondensation zone in a mole ratio to the acidic member charged of between about 0.8 and about 1.9 and preferably from about 1.0 and about 1.5. In addition, it is desirable that the hydroxyl groups of the monohydric alcohol and the defined compound having at least 3 hydroxyl groups be in a ratio to the carboxyl groups in the acidic member, fatty acid and furan containing acid of from about 0.8 to about 1.4 and preferably from about 0.9 to about 1.2. The ratio of the hydroxyl groups to the carboxyl groups can be determined by multiplying the number of hydroxyl groups present in each alcohol (compound and monohydric alcohol) times the number of moles of each alcohol present, obtaining a total, and dividing it by the total carboxyl groups calculated in a similar manner. When the defined monohydroxyl member is present, this member is also used in determining the suitable ratio of hydroxyl groups to carboxyl groups within the ranges given.

The polycondensation reaction is generally carried out in a vessel provided with a condensing system permitting trapping out of water of reaction. The defined dihydroxyl group affording material is usually first prepared and then mixed with the acidic member and monohydric alcohol (and monohydroxy member) at a temperature below about 350° F. and preferably from about 300° F. to about 340° F. at which temperature the monohydric alcohol (and monohydroxyl member) and the acidic member react and then at a temperature above about 350° F. and preferably from about 350° F. to about 400° F. and especially about 360° F. where the dihydroxyl group affording material enters into the reaction. The reaction is continued until the desired acid number and cure time are reached or to the point where the viscosity increase of the contents of the reaction zone indicate that the gelation point is being approached. A suitable acid number is generally between about 25 and about 70 and commonly from about 35 to about 60 with the cure time being about 40 seconds or below with the lower cure times being preferred because of better drying times.

Another general method can be carried out by first reacting the monohydric alcohol (and monohydroxyl member) with the acidic member at the described temperature below about 350° F., then adding the dihydroxyl group affording material, and reacting the products of the first step with the dihydroxyl group affording material at the described temperature above about 350° F.

It is advantageous when a high melting acid such as trimesic acid is utilized for the polycondensation reaction product to either dissolve the acid in a suitable solvent and then prepare the polycondensation reaction product under the conditions described, or to heat the acid monohydric alcohol (and monohydroxyl member) at about 340° F., and then to add the dihydroxyl group affording material and heat the solution at about 360° F. until the desired acid number and cure time are reached.

The dihydroxyl group affording material is generally prepared by reacting the compound, fatty acid, and furan containing acid with continuous removal of the water of reaction. Suitable temperatures for pentaerythritol, tall acid, and furoic acid are in the order of 450–520° F. This temperature will vary depending on the particular compound, fatty acid, and furan containing acid utilized.

In addition to the above reactants, a monohydroxyalkylene furan may be utilized in preparing the polycondensation reaction product and the water-soluble resin. This alcohol has from 1 to about 3 carbon atoms in the alkylene group with monohydroxymethylene furan (furfuryl alcohol) being the most notable member of the class. The alcohol generally is characterized by its tendency to react under acidic conditions with itself or other materials such as the unsaturated groups in the fatty acids and this aids in improving the properties such as drying time of the resulting water soluble resin. Because of the high degree of reactivity of the alcohol, it is preferred that it be added to a polycondensation reaction product having an acid number of below about 100 and preferably about 70–100. The mixture of product and alcohol (about 2–25% by weight) is then heated at about 300–340° F. until the desired acid number is reached.

An alkaline agent and the polycondensation reaction product are reacted together to produce a water-soluble resin. Usually, enough agent is used to neutralize the acidity of the polycondensation reaction product; less may be utilized. The amount of alkaline agent material is most readily determined by following the pH of the aqueous medium. The polycondensation reaction product passes in the solution substantially completely at a pH of about 5 and practically in all instances, will be in a complete solution at a pH of about 6. The use of alkaline agent in excess of that needed to bring about the desired water soluble resin is not harmful. Suitable ranges of the pH are from 6–9 with the preferred range being from 7–8.

The viscosity of the water soluble resin solution may be affected by the solids content of the solution. In general, higher solids content will result in higher viscosities which may be lowered by adding the lower alkanols such as isopropyl alcohol and butyl alcohol and/or small amounts of organic solvents, such as mineral oil. A particularly suitable solids content is about 45% by weight based on the polycondensation reaction product which results in a resin solution having an especially desirable viscosity.

The alkaline reacting agent may be ammonia, alkylamine, heteroamine, or an alkalolamine. Aqueous solutions of ammonia hydroxide are suitable. A particularly useful concentration is about 1.5–4% $NH_3$ (by weight) of resin solids (polycondensation reaction product). The alkylamines, particularly the lower molecular weight containing not more than 4 carbon atoms in each alkyl group such as triethylamine are suitable. The alkanolamines, such as 2-amino-2-methyl-1-propanol, ethanolamine and dimethylethanolamine, are especially suitable. The heteroamines, such as morpholine and piperidine may also be used. The type of alkaline reacting material utilized is determined in part by the characteristics desired in the final water soluble resin; also, by the type of resin product which is to be converted to a water soluble form.

The neutralization reaction is carried out by contacting the resin and the aqueous alkaline reacting medium. It is preferred that the temperature be warm, i.e., maintained in the region of 100–160° F. The two are agitated until the resin has passed into solution. The water solutions of the water soluble resin are clear liquids usually containing some opalescent appearance; the solutions may be colorless or colored, depending on the particular water soluble resin present. These water soluble resins produce air-dry coatings having good drying properties and films having good hardness properties. In addition, the resins have good stability under storage conditions.

When a paint composition is to be formed, pigments such as titanium dioxide and the resin solution are mixed together. The various cobalt and lead driers in the paint industry may then be added. Those include the commercial naphthenates and talloates and the recently discovered furoates. In addition, color imparted bodies may be utilized to give color in the paint. Many paints prepared from these resins exhibit very good gloss characteristics.

EXAMPLES

One typical resin of this invention was prepared and its water solubility properties compared to a resin having benzoic acid instead of the furan containing acid.

Resin I

Resin I was prepared in a two liter kettle equipped with a thermometer, stirrer, nitrogen bubbler and a Dean Stark water trap. 150 grams of pentaerythritol (1.1 moles), 84 grams of furoic acid (0.8 mole), and 392 grams of tall acid (1.4 moles) were charged to the resin kettle and heated at a temperature of about 520° F. until the water of reaction ceased to be evolved. Approximately 39 grams of water were driven off during the reaction. 192 grams of trimellitic anhydride (1.0 mole), 41 grams of tetrafurfuryl alcohol (0.4 mole) and 553 grams of tritalloate of pentaerythritol (0.6 mole) were charged to the contents of the resin kettle. The resulting contents were heated at 300° F. (about 1 hour) and then heated at about 360° F. until the product in the kettle had an acid number of about 49 and a cure time of about 20 seconds. The calculated oil length was about 70%. The product was converted into a water soluble resin by dissolving the product in an aqueous ammonia hydroxide solution (about 2–3% $NH_3$ by weight based on weight of starting product). Commercial cobalt naphthenate (6% cobalt by weight) and lead naphthenate (24% lead by weight) driers were added to the solution (about 1–2 grams of each drier per 135 grams of product). The solution was *clear* demonstrating that a solution had been formed. Clear films of the solution dried in about 16 hours.

Comparison resin A was prepared in the resin kettle described for Resin I. 190 grams of pentaerythritol (1.4 moles), 97 grams of benzoic acid (0.8 mole) 448 grams of tall acid (1.6 moles), 192 grams of trimellitic anhydride (1.0 mole), and 41 grams of tetrahydrofurfuryl alcohol (0.4 mole) were reacted under the conditions described for Resin I to prepare a product. The pentaerythritol, benzoic acid, and tall acid were first reacted and the trimellitic anhydride and tetrahydrofurfuryl alcohol were then added. The resulting product had an acid number of about 54 and a cure time of about 20 seconds. The oil length was calculated to be about 53% (calculated as triglyceride). The product was converted into a water soluble resin using the aqueous ammonia solution, and cobalt and lead naphthenate driers described for Resin I. The resulting mixture was hazy which indicated that the resin was not completely soluble. Films of this resin dried in about 18 hours.

The above results demonstrate that Resin I having an oil length of about 70% and furoic acid attached to the pentaerythritol was completely water soluble. The results also demonstrate that resin A having an oil length of about 53% and benzoic acid in place of furoic acid was not completely water soluble as indicated by the haziness of the aqueous mixture.

Thus having described the invention, what is claimed is:
1. A resin having water solubility and being suitable for the formation of an air-dry surface coating film which resin comprises a reaction product of (I) a polycondensation reaction product of (a) an acidic member being selected from at least one member of the class consisting of trimellitic acid, trimellitic anhydride, hemimellitic acid, hemimellitic anhydride, trimesic acid (b) an ether containing monohydric alcohol selected from at least one member of the class consisting of monohydroxyalkylene tetrahydrofuran having from 1 to about 4 carbon atoms in said alkylene group and polyalkylene glycol monoalkyl ether having from 2 to 8 ether groups, from 2 to 3 carbon atoms in each alkylene group, and from 1 to 8 carbon atoms in said alkyl group, and (c) a dihydroxyl group affording material derived from a compound affording 3-4 hydroxyl groups, an unsaturated fatty acid and a furan substituted aliphatic acid having from 1 to about 3 carbon atoms in said aliphatic acid group, said monohydric alcohol being present in a mole ratio to said acidic member of at least about 0.4, said polycondensation reaction product being characterized by an oil length of from about 45% to about 80%, said furan substituted acid being present in an amount sufficient to impart water solubility to said reaction porduct, and (II) an alkaline agent selected from the class consisting of ammonia, alkylamines, heteroamines, and alkanolamines, said resin being characterized by being water soluble.

2. The resin of claim 1 wherein the hydroxyl groups of said monohydric alcohol and said compound are present in a ratio to the carboxyl groups of said acidic member, fatty acid, and furan substituted acid of from about 0.8 to about 1.4.

3. The resin of claim 1 wherein said acidic member is trimellitic anhydride.

4. The resin of claim 1 wherein said monohydric alcohol is 2-hydroxymethylene tetrahydrofuran.

5. The resin of claim 1 wherein said compound is pentaerythritol and said fatty acid is a tall fatty acid.

6. The resin of claim 1 wherein said furan containing acid is a furan substituted methanoic acid.

7. The resin of claim 1 wherein said alkaline agent is ammonia.

8. A resin having water solubility and suitable for the formation of an air-dry surface coating film which resin comprises a reaction product of (I) a polycondensation reaction product of (a) trimellitic anhydride, (b) 2-hydroxymethylene tetrahydrofuran, (c) a dihydroxyl group affording material derived from pentaerythritol, tall acid, and furan substituted methanoic acid, (d) tritalloate of pentaerythritol, said tetrahydrofuran and tritalloate being present in a mole ratio to said trimellitic anhydride of about 0.4 and 0.6 respectively, said polycondensation reaction product being characterized by an oil length of about 70%, said furan-containing acid being present in an amount sufficient to impart water solubility to said reaction product, said amount being in a mole ratio to said pentaerythritol of at least about 0.8: 1.1, and (II) ammonia.

9. The resin of claim 8 wherein the hydroxyl groups of said tetrahydrofuran, pentaerythritol, and tritalloate, are present in a ratio to the carboxyl groups of said trimellitic anhydride, tall acid, and furan substituted methanoic acid of from about 0.8 to about 1.4.

References Cited by the Examiner
UNITED STATES PATENTS 1,860,098 5/32 Jaeger _____ 260—843
3,066,108 11/62 Broadhead _____ 260—77

OTHER REFERENCES

Application No. 181,840, Nichols, March 19, 1962.

LEON J. BERCOVITZ, *Primary Examiner.*